May 12, 1970  D. P. SPROUL  3,512,001
SYSTEM FOR MEASURING DIFFERENTIAL ABSORPTION IN WHICH THE
TRANSDUCER CIRCUIT GAIN IS VARIED
Filed Sept. 22, 1966  3 Sheets-Sheet 2

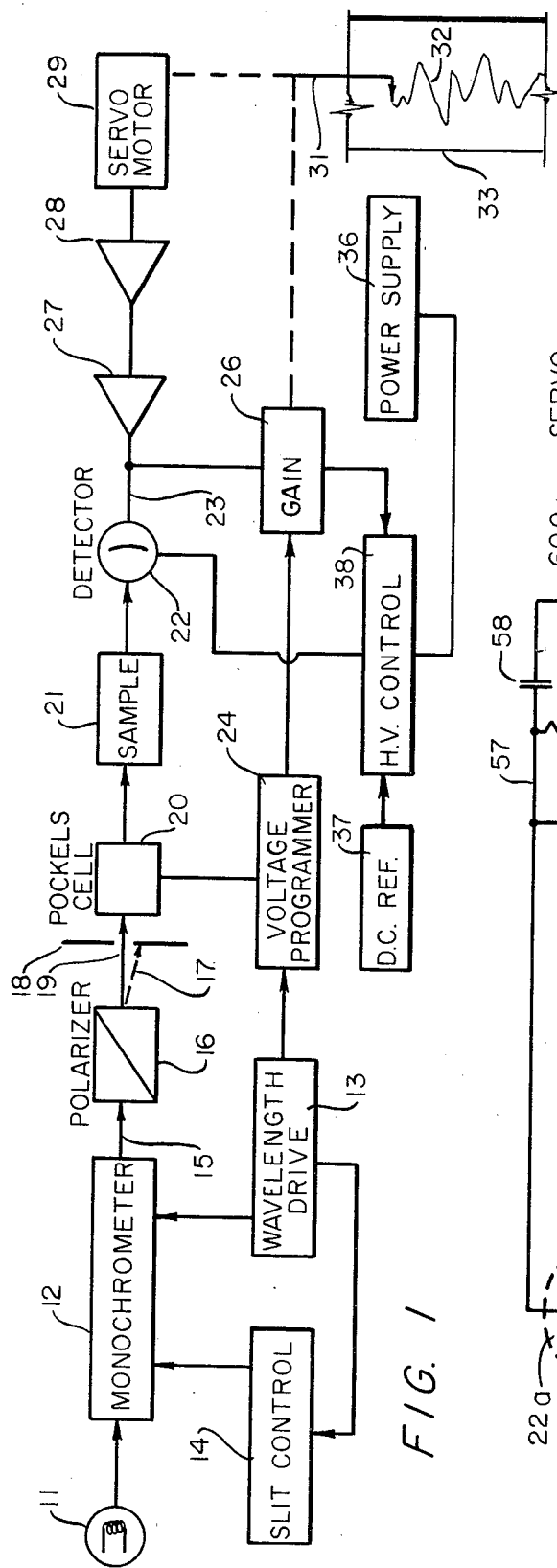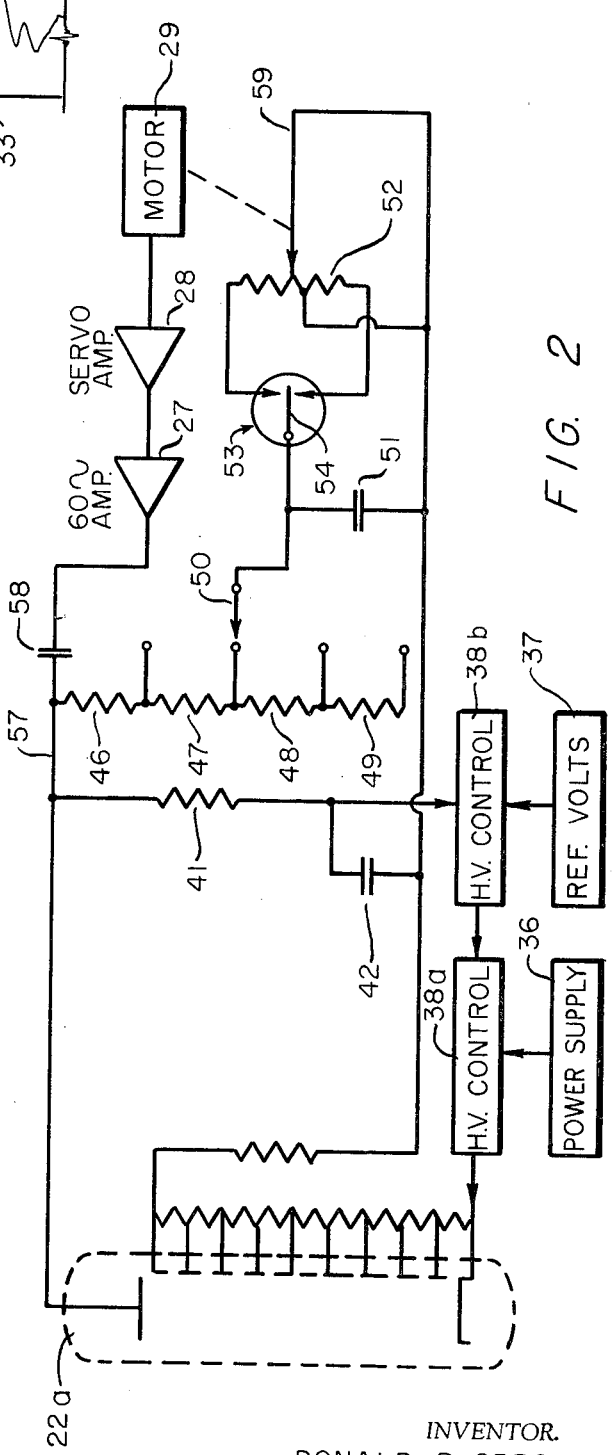

INVENTOR.
DONALD P. SPROUL
BY
ATTORNEYS

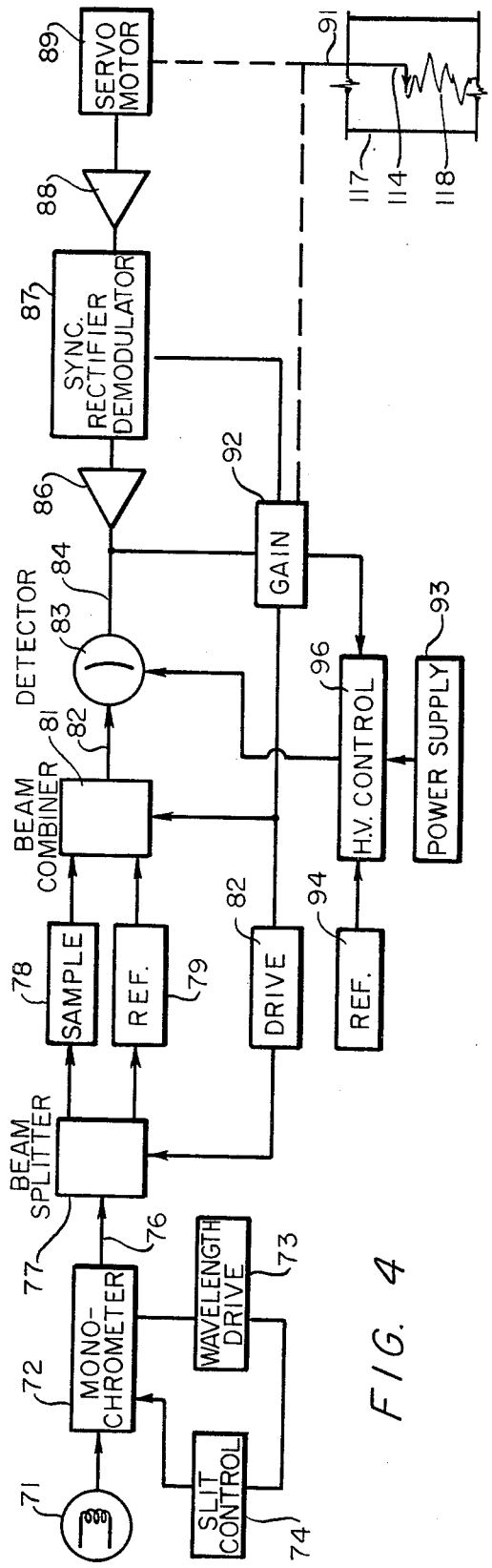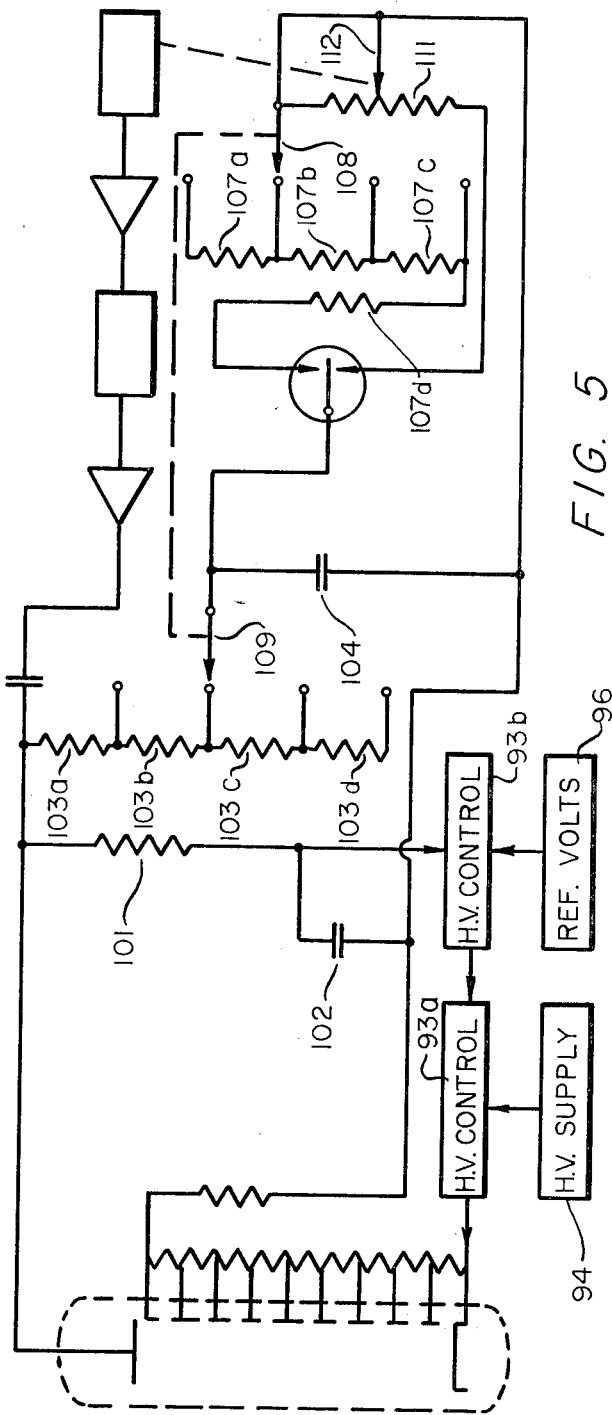

United States Patent Office 3,512,001
Patented May 12, 1970

3,512,001
SYSTEM FOR MEASURING DIFFERENTIAL ABSORPTION IN WHICH THE TRANSDUCER CIRCUIT GAIN IS VARIED
Donald Patrick Sproul, Los Altos, Calif., assignor to Durrum Instrument Corporation, Palo Alto, Calif., a corporation of Nevada
Filed Sept. 22, 1966, Ser. No. 581,232
Int. Cl. G01n 21/22, 21/24, 21/02
U.S. Cl. 250—218       7 Claims

ABSTRACT OF THE DISCLOSURE

A differential absorption measuring system in which light subjected to different absorption alternately impinges on a transducer, the gain of the transducer circuit is varied to provide a constant output signal. The gain adjustment gives an indication of the differential absorption.

BACKGROUND OF THE INVENTION

This invention relates generally to a differential absorption measuring system and more particularly to a system operating on a null balance principle for demodulating and measuring an amplitude modulated light beam.

The system to be described applies primarily to the detection, demodulation and recording of the differential absorption of right and left circularly polarized light (circular dichroism) by certain optically active materials. The system also applies to the detection, demodulation and recording of the differential absorption of monochromatic ultraviolet, visible or infra-red radiation by certain materials such as takes place in dual beam spectrophotometers.

In circular dichroism recorders, radiation from a high intensity source is passed through a monochrometer whose wave length and band pass are continuously adjusted, either automatically or manually. The monochromatic radiation is passed through a polarizer and on through a system which serves to act upon the beam and impart thereto alternately left and right circular polarization. The circularly polarized radiation is then projected through a sample and on to a detector. If the sample is optically active (circular dichroism), it will differentially absorb the right and left circularly polarized radiation and an A-C component at the modulation frequency will appear at the output of the detector along with a D-C signal. If there is no circular dichroism, only a D-C signal will appear at the output. The overall gain of the system is continuously adjusted so that the D-C component is held constant.

In practice, one type of existing instrument amplifies the alternating and the direct components of the output signal and records their ratio as the circular dichroism of the sample. This type of system has the disadvantage that any change in gain of either of the amplifiers or non-linearity of the amplifiers will affect the accuracy of the recorded circular dichroism.

In dual beam beam spectrophotometers, a beam of monochromatic energy is passed through a beam splitting device which separates the energy into two beams. These two beams are passed through a sample and reference compartment and are then combined and received by a detector. It is the practice in existing instruments to pass the beams alternately to the detector with an off time between the sample and reference beams. The detected signal is amplified and separated into the two components by a synchronous detector which switches during the off time. The absorption of the sample is recorded as the ratio of the sample and the reference signals. The system has several disadvantages. The linearity of the amplifier and the stability of the beam splitting device are critical. The linearity for optical densities greater than two is poor. The transient response of the sample and reference channels must be identical.

SUMMARY OF INVENTION AND OBJECTS

A differential absorption measuring system in which the alternating component of the signal from a transducer which alternately receives light subject to different absorptions are detected to provide an output signal and means are responsive to the output signal for varying the gain of the transducer circuit in synchronism with said light to maintain the output of the system constant and the gain adjustment indicates the differential absorption.

It is an object of the present invention to provide an improved differential absorption measuring system for use in circular dichroism recorders and in dual beam spectrophotometers.

It is another object of the present invention to provide a differential absorption measuring system in which the effect of variations in gain in linearity of the amplifiers and other electronic components, and transients in the source and electronic systems are minimized.

It is another object of the present invention to provide a system of the above type which is simple in construction and reliable in operation.

The foregoing and other objects of the invention will become more clearly apparent from the following description when taken in conjunction with the accompanying drawing.

Referring to the drawing:

FIG. 1 shows a schematic block diagram of the optical and electrical components of a circular dichroism recorder incorporating the present invention;

FIG. 2 is a more complete diagram of the electrical measuring portion of the recorder of FIG. 1;

FIG. 4 is a schematic block diagram of the optical and electrical components of a split beam spectrophotometer incorporating the present invention;

FIG. 5 is a more complete diagram of the electrical portion of the spectrophotometer of FIG. 4.

Figure 3:
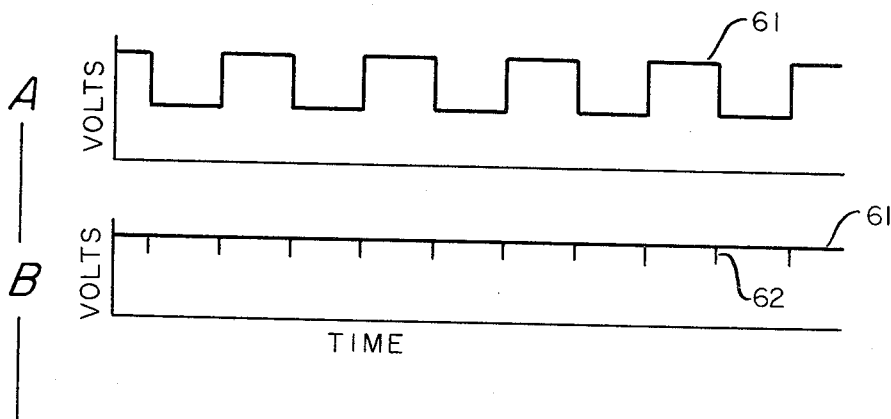
FIG. 3 shows the waveforms appearing at the output of the detector for conditions of balance and non-balance of the system shown in FIGS. 1 and 2.

Referring to FIG. 1, a high intensity source 11 provides radiation to a monochrometer 12 which may be of conventional design. The monochrometer may include a wave length drive means 13 for selecting the wave length of the output from the monochrometer and also a slit control drive means 14 for controlling the slit width to thereby control the amount of the monochromatic energy appearing in the beam 15. By proper tracking of the wave length drive and slit control, the energy of the beam 15 can be maintained substantially constant.

The monochromatic beam 15 is applied to a polarizer 16 which may be a Rochon polarizer prism. The polarizer 16 produces an extraordinary beam 17 which may be interrupted by a diaphragm 18 and ordinary beam 19 which is projected to a Pockel cell or quarter wave plate 20. The Pockel cell or quarter wave plate is electrically energized with a voltage of predetermined frequency, $f$, and amplitude whereby to alternately and periodically right and left circularly polarize the beam travelling through the same. The beam which is alternately right and left circularly polarized is then applied to sample 21. The emergent beam impinges upon an opto-electrical transducer 22 which serves to provide an output electrical signal at line 23. The amplitude of the electrical signal is proportional to the intensity of the beam impinging on the transducer 22.

In the absence of optical circular dichroism, the right and left circularly polarized light will be absorbed equally by the sample and the output signal on line 23 will be a substantially constant D-C signal. If the sample has optical circular dichroism, the right and left circularly polarized light will be absorbed by different amounts and the output signal will include an A-C component having the frequency of the excitation signal for the Pockel cell and an amplitude which is proportional to the difference in absorption of the right and left circularly polarized light by the sample material.

As previously described, the Pockel cell or quarter wave plate is driven by a voltage of predetermined frequency and amplitude. Such a voltage may be supplied by a programmer 24 which also provides a signal to a gain control 26. The gain control serves to control the gain of the electrical portion of the recorder automatically and in synchronism with the frequency of excitation of the Pockel cell whereby when the gain is properly adjusted, a substantially constant D-C signal will appear at the input to amplifier 27. When the gain is not properly adjusted, an A-C component will appear at the amplifier 27. The amplifier amplifies the A-C signal and provides excitation to servo amplifier 28. The servo amplifier drives a servo motor 29.

The servo motor is mechanically connected to gain control means to adjust the gain of gain control 26 so as to balance out A-C components in the signal to the amplifier 27. Simultaneously, the servo motor may drive a pen 31 which provides a record 32 on a suitably driven chart 33.

The detector 22 may be a photomultiplier tube 22a which includes a power supply 36, a reference voltage source 37, and high voltage control 38 which compares the photomultiplier output voltage with the reference voltage and provides the necessary high voltage signal to the photomultiplier tube to maintain a nearly constant overall D-C output.

Referring to FIG. 2, the photomultiplier tube 22a is shown including the power supply 36, a reference voltage source 37 and high voltage controls 38a and 38b serving to control the voltage applied to the photomultiplier tube 22a. The high voltage control 38b obtains a signal from the common point of the resistor 41 and bypass capacitor 42 and the reference signal from source 37 and controls the voltage from power supply 36 through control 38a.

The load circuit for the photomultiplier tube includes the parallel A-C paths including resistor 41 and capacitor 42 and one or more of resistors 46, 47, 48 and 49, depending on the position of switch 50, and capacitor 51. A D-C path is provided which includes one or more of the resistors 46, 47, 48 and 49 and a selected portion of resistor 52 depending upon the position of switching means 53.

The switching means 53 may comprise a mechanical chopper which is driven in synchronism with the Pockels cell 20 and serves to alternately connect the upper contact or the lower contact to the contact 54 which may be alternately connected to one of the resistor taps. Thus, in the position shown, the resistors 46, 47, and either the upper or lower portion of resistor 52, depending upon the position of the vibrating contact 53, is connected in series and forms the D-C load for the photomultiplier tube.

Any A-C component appearing at the point 57 will be passed by the capacitor 58 and amplified by the amplifier 27, applied to servo amplifier 28 which then drives servo motor 29. The servo motor is mechanically connected to move the movable tap 59 along the resistor 52.

The voltage appearing on the line 57 will be dependent upon the ratio between the resistance selected by switch 50, as shown, resistors 46, 47, and the portion of resistor 52 connected in series therewith. Assuming that there is no differential absorption, then the servo motor will drive the movable tap 59 until it reaches a position where the portions of resistor 52 connected in either position of contact 54 are equal. Assuming that the right circularly polarized light is absorbed to a greater extent than the left circularly polarized light, then an A-C signal will appear on the line 57 and cause the motor 29 to drive the wiper 59. The motor will drive the wiper in a direction such that the gain for the output of the right circularly polarized light is increased and the gain for the left circularly polarized light decreased whereby to adjust for a zero output A-C voltage at the point 57. The amount of adjustment required to render the output signal zero is an indication of the ratio of differential absorption and, therefore, the circular dichroism of the sample.

FIG. 3A shows the signal at point 57 for the nonbalance. An A-C signal 61 is superposed on the D-C component. FIG. 3B shows the signal for balanced condition. The pips 62 occur at the switching of the contact 54.

Thus, it is seen that there is provided a null balance system which serves to adjust its balance in such a manner as to eliminate any A-C components in the output voltage. The amount of adjustment of the gain is an indication of the differential absorption.

Referring to FIG. 4, there is shown a dual beam spectrophotometer. The spectrophotometer includes a high intensity light source 71 which applies light to monochromater 72. The monochrometer may include a wave length drive 73 and a slit control 74 to thereby control the intensity of the beam 76 in the manner previously described. The beam 76 is applied to a beam splitter 77 which alternately applies the light beam 76 to the sample 78 and to a reference 79. The outputs of the sample and reference cells are applied to a beam combiner 81 which is driven by the drive 82 in synchronism with the beam splitter to thereby recombine the signals and provide an output signal 82 to the electro-optical transducer 83.

If the absorption of the sample and reference are identical, then the light intensity will be constant and the output 84 from the transducer will be a D-C signal. However, if there is a difference in absorption between the sample and the reference, then the intensity of light will alternate at the transducer 83 and an A-C signal having the driving frequency will appear at 84. This signal can be applied to a selective amplifier 86 which is tuned to the beam splitter drive frequency and its output applied to a synchronous rectifier and remodulator 87 which provides an output A-C signal to the amplifier 88. The output of amplifier 88 drives servo motor 89. The servo motor 89 can drive a chart pen 91 and also adjust the gain of the gain control 92 whereby to synchronously adjust the gain of the system so that the input to the amplifier 86 is a D-C signal.

A high voltage power supply 93, reference source 94 and high voltage control 96 apply controlled voltage to the photomultiplier tube.

FIG. 5 is a detailed circuit diagram of the gain control 92 shown of FIG. 4. The high voltage control for the photomultiplier tube includes controls 93a and 93b which operates in the manner previously described with reference to FIG. 2.

The A-C load for the photomultiplier tube includes the parallel combination of resistors 101 and capacitor 102 and selected resistors 103a, 103b, 103c and 103d, and the capacitor 104. The D-C load for the photomultiplier tubes includes one or more of the resistors 107 which are selected by the switch 108 which is ganged to the switch 109 or the resistance 111 selected by movable contact 112. The resistance 109 is controlled by a servo motor and is adjusted to provide a gain which serves to synchronously balance the overall gain of the system so that no A-C signal appears on line 84.

Figure 6:
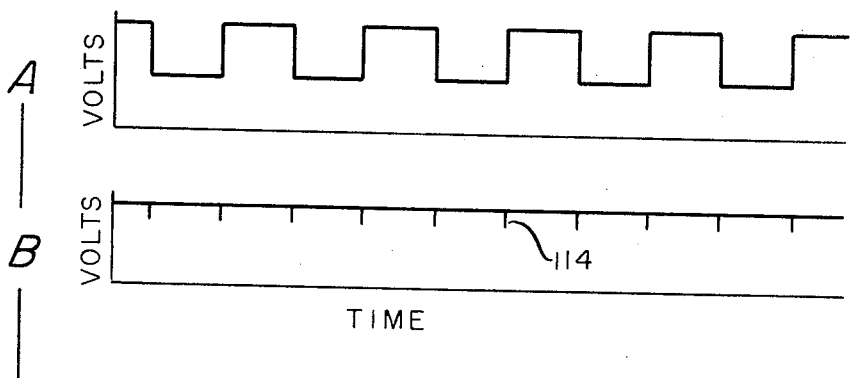
FIG. 6 shows the waveforms appearing at the output of the detector for conditions of balance and non-balance of the system shown in FIGS. 4 and 5.

FIG. 6A shows the waveforms appearing at off balance and FIG. 6B at balance with the pips 114 showing the switching transients.

The position of the wiper 112 is an indication of the difference in absorption for the two beams and is, therefore, an indication of the differential absorption. The wiper 112 may be mechanically tied to a pen 114 of a recorder such as schematically illustrated in FIG. 4. Chart paper 117 is continuously moved at a constant rate with respect to the pen 114 to thereby provide a curve 118.

It is to be observed that at balance, the gain and linearity of the amplifiers are not important. Any change of gain or linearity may vary the time for obtaining balance but will not affect the balance reading.

I claim:

1. A differential absorption measuring system of the type adapted to receive signals from a transducer which alternately at a predetermined frequency receives light subject to different absorptions and gives an indication of the differential absorption comprising means for receiving the output signal from said transducer and detecting an alternating component of the signal resulting from a difference in light intensity impinging on said transducer because of differential absorption and serving to provide an output signal, means responsive to the output signal for varying the gain of the system at the transducer in synchronism with said light to maintain the output signal of the transducer constant, and means for indicating the gain adjustment.

2. A differential absorption measuring system as in claim 1 in which said means for varying the gain comprises a servo-system including a gain control.

3. A differential absorption measuring system as in claim 2 in which said gain control comprises a resistive load circuit connected to receive the output from said transducer, said load circuit including means for selectively introducing first and second resistive loads in synchronism with the light whereby to vary the gain of the system at the transducer.

4. A differential absorption measuring system as in claim 3 wherein said means for selectively introducing first and second resistive loads comprises switching means for alternately connecting at said predetermined frequency first and second resistances in said load circuit.

5. A differential absorption measuring system as in claim 1 in which said means for detecting an alternating component and providing an output signal comprises an A–C amplifier and said means for varying the gain comprises a servo-system including a gain control.

6. A differential absorption measuring system as in claim 5 in which said gain control comprises a resistive load circuit connected to receive the output from said transducer, said load circuit including means for selectively introducing first and second resistive loads in synchronism with the light.

7. A differential absorption measuring system as in claim 6 wherein said means for selectively introducing first and second resistive loads comprises switching means for alternately connecting at said predetermined frequency first and second resistances in said load.

References Cited

UNITED STATES PATENTS

| | | | |
|---|---|---|---|
| 2,896,165 | 7/1959 | Hornig et al. | 324—140 |
| 2,984,149 | 5/1961 | Herscher et al. | |
| 3,207,996 | 9/1965 | Sundstrom. | |
| 3,242,797 | 3/1966 | Sundstrom. | |
| 3,329,821 | 7/1967 | Lesage | 250—218 X |

RALPH G. NILSON, Primary Examiner

M. ABRAMSON, Assistant Examiner

U.S. Cl. X.R.

356—89